(12) United States Patent
Yoshimura et al.

(10) Patent No.: US 6,847,415 B1
(45) Date of Patent: Jan. 25, 2005

(54) FLAT DISPLAY UNIT AND METHOD FABRICATING SAME

(75) Inventors: Hiroshi Yoshimura, Miyazaki (JP); Morimitsu Iwai, Miyazaki (JP); Kouichi Kawahara, Miyazaki (JP)

(73) Assignee: Fujitsu Limited, Kanagawa (JP)

( * ) Notice: Subject to any disclaimer, the term of this patent is extended or adjusted under 35 U.S.C. 154(b) by 0 days.

(21) Appl. No.: 09/375,007

(22) Filed: Aug. 16, 1999

(30) Foreign Application Priority Data

Dec. 18, 1998 (JP) .......................................... 10-361684

(51) Int. Cl.⁷ ............................................ G02F 1/1333
(52) U.S. Cl. ...................... 349/58; 349/149; 349/187
(58) Field of Search ............................. 349/58, 59, 60, 349/149, 150, 151, 152, 187; 361/681; 445/24

(56) References Cited

U.S. PATENT DOCUMENTS

| | | | | |
|---|---|---|---|---|
| 3,910,029 A | * | 10/1975 | Yamazaki ..................... | 368/84 |
| 4,808,990 A | * | 2/1989 | Kamigaki et al. .......... | 340/975 |
| 5,450,221 A | * | 9/1995 | Owen et al. .................. | 349/58 |

FOREIGN PATENT DOCUMENTS

GB    2 057 167    *  3/1981

JP    9-44096    2/1997

OTHER PUBLICATIONS

Patent Abstracts of Japan of Japanese Laid–Open Patent Application No. 9–44096, M. Ishizuka et al., "Electronic Apparatus With Liquid Crystal Display Panel." 2/97.

* cited by examiner

Primary Examiner—Toan Ton
Assistant Examiner—Tai Duong
(74) Attorney, Agent, or Firm—Staas & Halsey LLP (57) ABSTRACT

A flat display unit has a chassis combining a display panel and circuit boards for driving the display panel into a unit in which the display panel and the circuit boards are mounted on respective opposite surfaces of the chassis. The chassis is provided with a bank (i.e., sidewall) extending about the periphery of opposite main surfaces of the chassis including at least the surface on which the display panel is mounted, perpendicularly to that surface and surrounding the periphery of the display panel 3, and hence protecting the display panel without requiring a protector, as is conventionally used during the processes of assembling, testing and transporting thereof. The chassis is also provided with through-holes and optionally with a cut-out, which are formed in the periphery of the chassis, for facilitating interconnections between the display panel and the circuit boards by flexible cables which pass therethrough.

23 Claims, 10 Drawing Sheets

FLAT DISPLAY UNIT AND METHOD FABRICATING SAME

BACKGROUND OF THE INVENTION

1. Field of the Invention

The present invention relates to a flat display unit and a method for fabricating the same.

Display devices such as plasma display, liquid crystal display, EL (electroluminescence) display and FED (field emission display) are being paid attention as the devices for wall type display apparatus, as is well known.

However, these devices usually have a structure composed of one or a pair of glass substrates adhered to each other and, therefore, are mechanically weak, and an improvement to reinforce the mechanical strength of the devices is needed.

2. Description of the Prior Art

Figure 9A:
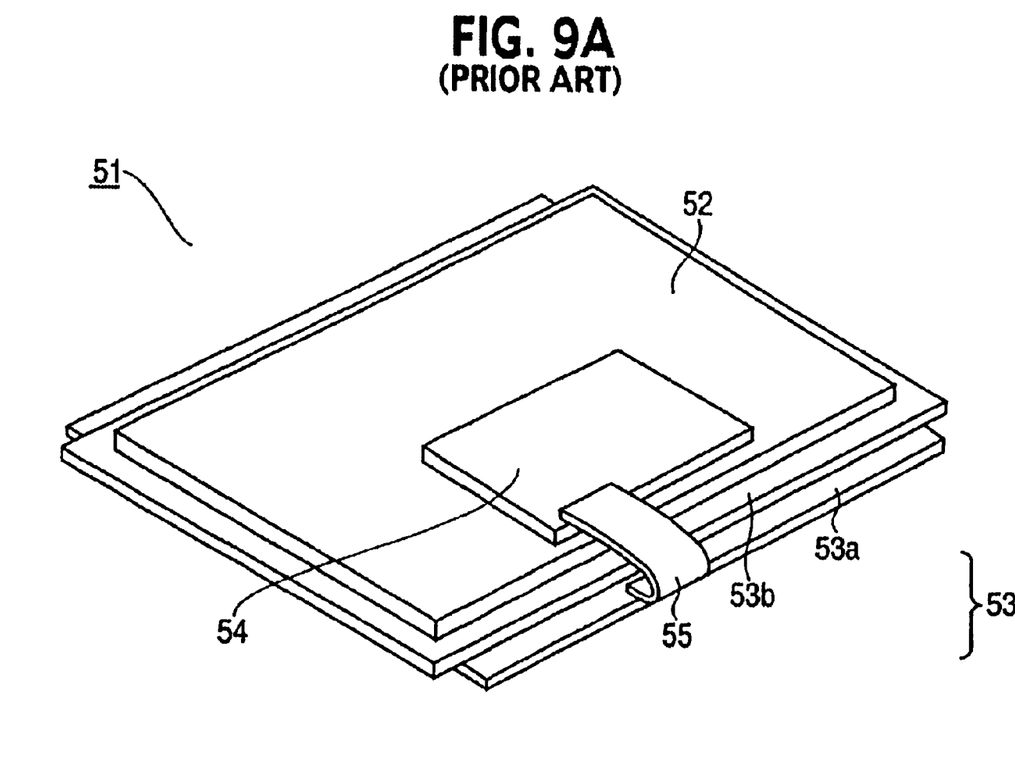
FIGS. 9A and 9B are a perspective view and a sectional view, respectively, both showing a conventional plasma display unit.
Figure 9B:
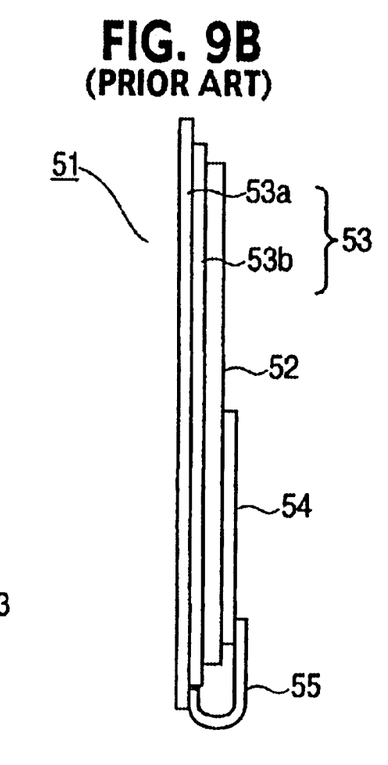
Figure 10A:
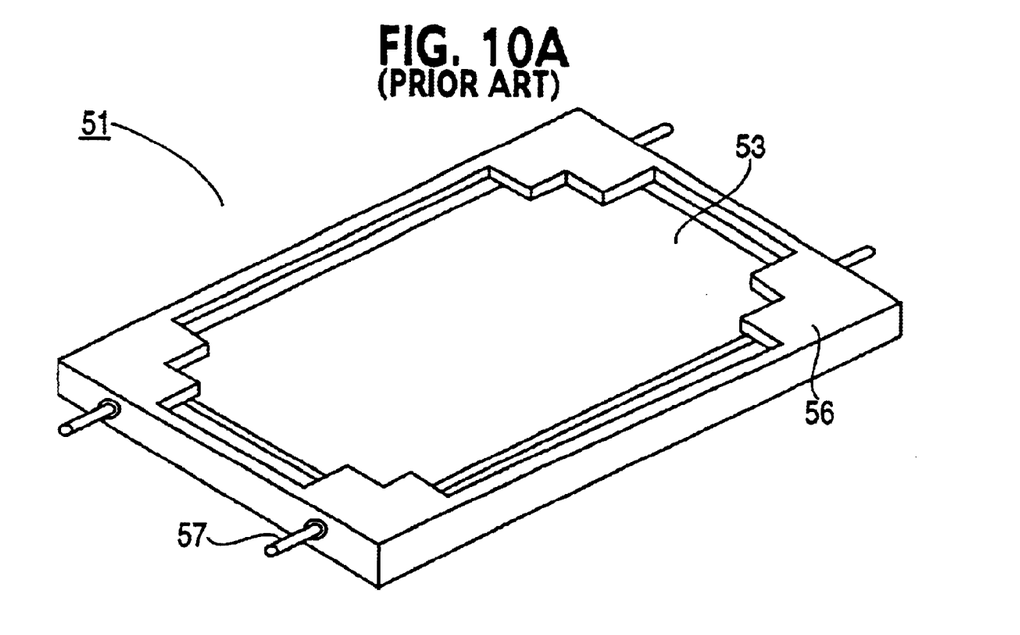
FIGS. 10A and 10B are a perspective view and a sectional view, respectively, both showing a conventional plasma display unit equipped with a protector according to the prior art.
Figure 10B:
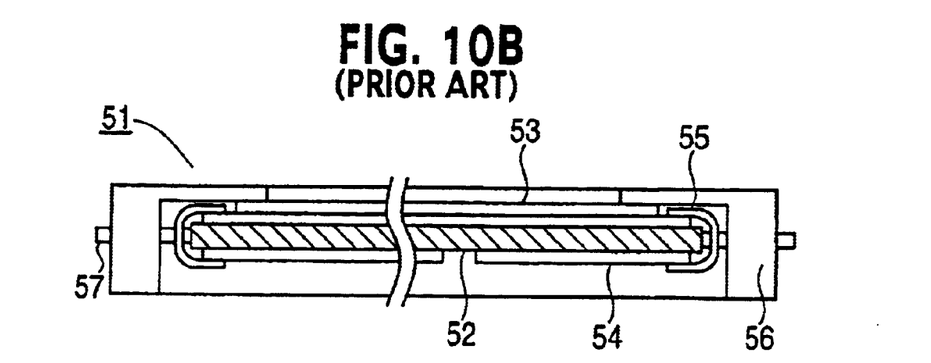

Prior art flat display unit will be explained with reference to FIGS. 9A, 9B, 10A and 10B by taking a plasma display unit as a typical example, in which FIGS. 9A and 9B are a perspective view and a sectional view thereof, respectively, and FIGS. 10A and 10B are a perspective view and a sectional view, respectively, both showing a protector attached to the display unit during the assembling process of the display unit.

As shown in FIGS. 9A and 9B, plasma display unit 51 has an integrated structure of a display panel 53 and a circuit board 54 which are combined through a chassis 52, where display panel 53 is composed of a front substrate 53a and a rear substrate 53b which are adhered to each other with a discharge space therebetween, and circuit board 54 has a plurality of driver circuits mounted thereon for supplying a predetermined voltage to display panel 53.

Further explaining in detail, display panel 53 is adhered to a surface of chassis 52 through the entire area of rear substrate 53b by using a bonding material such as a double-faced adhesive tape, while circuit board 54 is secured to another surface of the chassis by screw stop method, for instance.

As shown in FIG. 9B, chassis 52 is composed of a plate formed from a light metal such as aluminum and larger than the display panel. Chassis 52 is occasionally made having a structure in which a number of strips of metallic boards are assembled to form a lattice; thus, room is provided in the chassis and the heat dissipation characteristic thereof can be improved.

Display panel 53 and circuit board 54 are electrically connected to each other by a flexible cable 55, and a predetermined voltage is applied to the display panel 53 from circuit board 54.

In display panel 53, as shown in FIG. 9A, front substrate 53a and rear substrate 53b are bonded to each other such that respective ones of pairs of opposing edges of substrates 53a and 53b protrude from the respective corresponding edges of the counterpart substrates 53a and 53b, for instance. A group of display electrode terminals are exposed on the surface of the substrate in the protruding part, and the wiring at an end of flexible cable 55 is connected to the exposed terminal group, by applying a thermo-compression bonding of anisotropic conductive adhesive material.

The wiring at another end of flexible cable 55 is connected to circuit board 54 secured to another surface of chassis 52, via a not-shown connector.

Although only one respective circuit board 54 and flexible cable 55 is shown in FIGS. 9(a) and 9(b), a plurality of circuit boards are mounted on chassis 52 and a plurality of flexible cables are connected to these circuit boards, practically.

Display panel 53 is composed of a front substrate 53a and a rear substrate 53b adhered to each other, each formed of a glass plate, and is weak in the mechanical strength thereof, and therefore, the panel is equipped with a protector, during the processes for the integration with circuit board 54 after the assemblage of the panel, during the transfer among subsequent processes, and during the various tests and inspections, and thus is protected from the damage thereof.

FIGS. 10A and 10B are a perspective view and a sectional view, both showing a plasma display unit equipped with a protector.

Referring to FIGS. 10A and 10B, protector 56 is box-shaped and has a bottom surface provided with an opening, and a chassis 52 mounted with display panel 53 is set in the protector such that the front substrate of display panel 53 exposes from the opening in the bottom surface of the protector, and then, a plurality of securing pins 57 are screwed into at least a pair of opposite sides of the protector so as to pass therethrough and press to hold chassis 52 from the corresponding sides of chassis 52. Thus, display panel 53 is in a state where it is protected by protector 56.

After that, a circuit board 54 is mounted on chassis 52 through the opposite upper surface of protector 56, and secured thereto by screw-stop means, and then, one end of flexible cable 55 having another end connected to display panel 53 by a thermo-compression bonding, in advance, is connected to circuit board 54, and thus, the state of the display panel 53 equipped with a protector as shown in FIGS. 10A and 10B is completed.

In the state equipped with a protector, display panel 53 mounted on chassis 52 is transferred to the instruments for tests and inspections and is subjected to a test to be turned on, for instance. It is of course intended that display panel 53 is protected by the protector during the processes including such transfer and tests.

SUMMARY OF THE INVENTION

As explained with reference to FIGS. 9A and 9B, conventional flat display units, plasma display unit 51, for instance, usually have a structure in which display panel 53 is completely exposed, and therefore, it is highly possible that display panel 53 is broken, when lightly contacting with a foreign body, during the assemblage thereof with a circuit board, testing and inspections, and transfer among these processes.

To avoid this problem, the conventional flat display unit having a display panel 53 is equipped with a protector 56 as explained with reference to FIGS. 10A and 10B, but it takes time and labor in the attachment and detachment of the protector, and further, in case of large-scale flat display unit comprising a display panel having a screen size as large as the type 30 (30 inches) or more, for instance, protector 56 is so big and heavy that a carrier dedicated to carrying the protector is needed, and hence, the handling of the protector is complicated and troublesome.

In addition, since each display unit is equipped with an individual protector, it is necessary to prepare a number of protectors in advance for the mass production of the display units.

As described above, the conventional flat display units include such problems to be solved that the production efficiency is low and the production cost is high.

It is therefore an object of the present invention to provide a flat display unit and a method for fabricating the same, for solving above-mentioned problems in the prior art flat display units.

It is another object of the present invention to provide a flat display unit and a method for fabricating the same, wherein the display unit is made possible to protect the display panel thereof by itself, without a protector as adopted in the prior art flat display units.

It is further object of the present invention to provide a flat display unit and a method for fabricating the same, wherein the efficiency is high and the cost is low.

The flat display unit of the present invention comprises a display panel, a circuit board for driving the display panel, and a chassis for combining the display panel and the circuit board into a unit in such a manner that the display panel and the circuit board are respectively mounted on a pair of opposite surfaces of the chassis, wherein the chassis further comprises a side wall extending from the edge of the surface the display panel is mounted thereon, perpendicularly to the surface, and covering the periphery of the display panel.

Thus, in the present invention, the chassis has a mounting surface which is the area the display panel is bonded thereto, and a side wall at the periphery of the mounting surface, covering the periphery of the display panel, and hence, the periphery of the display panel f adhered to the chassis is protected by the side wall. Accordingly, the display panel can be prevented from the damage as explained above, without using a protector.

In addition, the chassis in the present invention plasma display unit may further comprise another side wall which extends from the edge of the surface on which the circuit board is mounted, perpendicularly to the surface, and covering the periphery of the circuit board.

According to this construction, it is also possible to protect the circuit board mounted on the rear surface of the chassis with respect to the display panel.

Still in addition, the chassis in the present invention plasma display unit may comprise fins provided on the surface, on which the circuit board is mounted, in the form of a plurality of protrusions.

According to this construction, the heat dissipation characteristic of the chassis is improved because the heat generated from the circuit board is easily removed from the chassis having an enlarged surface area thanks to the fin structure, and a space provided between the circuit board and the chassis.

Moreover, the chassis in the present invention plasma display unit may comprise a first sub-chassis having aforesaid display panel adhered thereto, and a second sub-chassis different from the first sub-chassis and having aforesaid circuit board mounted thereon, wherein the first and second sub-chassis are bonded each other through the respective rear surfaces thereof.

According to this construction, since the display panel and the circuit board are mounted on the individual first and second chassis, respectively, these processes can concurrently be conducted, and hence, production efficiency can be improved, and also, the display panel can get rid of receiving the load to be imposed in the process of mounting the circuit board.

Other and further objects, features and advantages of the invention will be apparent, more fully from the following description.

DESCRIPTION OF THE PREFERRED EMBODIMENTS

The embodiments of the present invention will be explained in detail in the following, with reference to drawings, by taking a plasma display unit as an example.

Figure 1A:
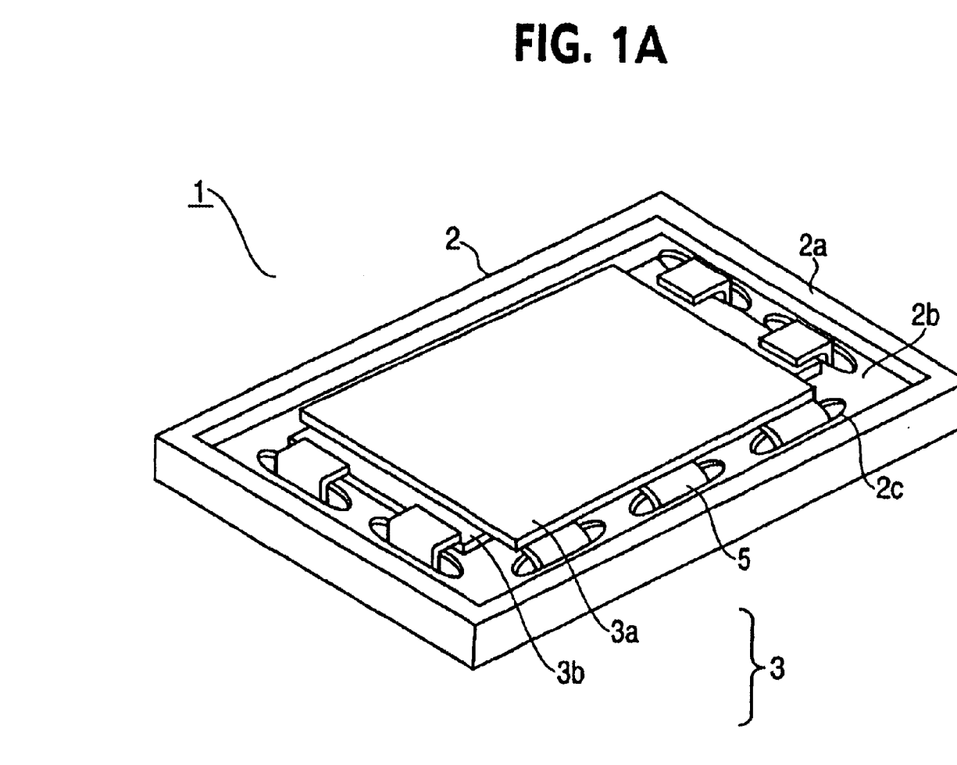
FIGS. 1A and 1B are a perspective view and a sectional view, respectively, both showing a plasma display unit according to the first embodiment of the present invention.
Figure 1B:
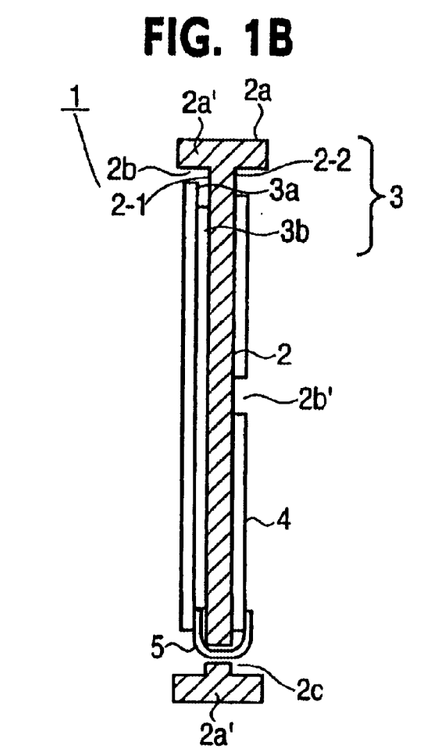
Figure 2A:
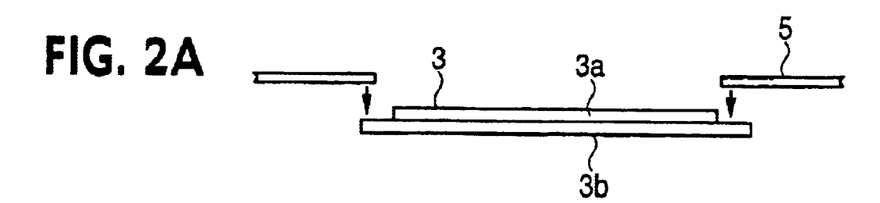
FIGS. 2A to 2D are sectional views showing an assembly process of a plasma display unit according to the first embodiment of the present invention.
Figure 2B:
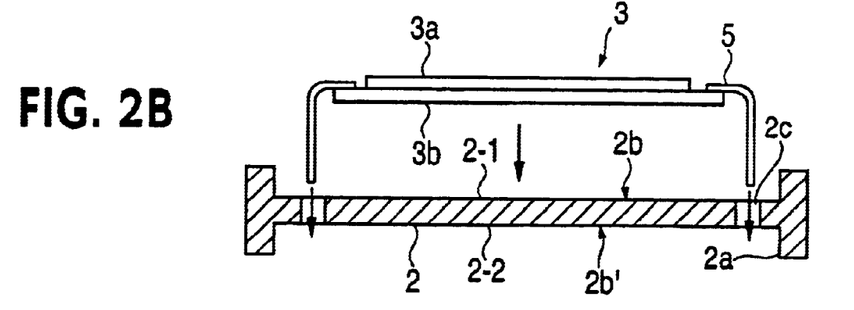
Figure 2C:
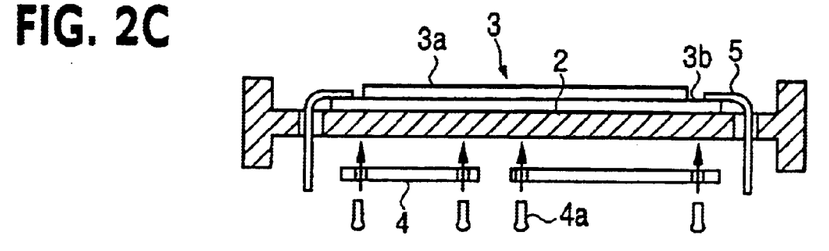
Figure 2D:
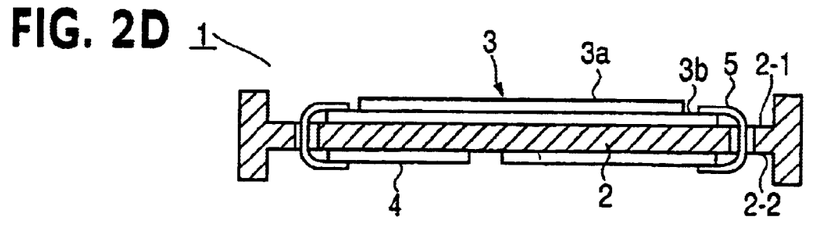
Figure 3:
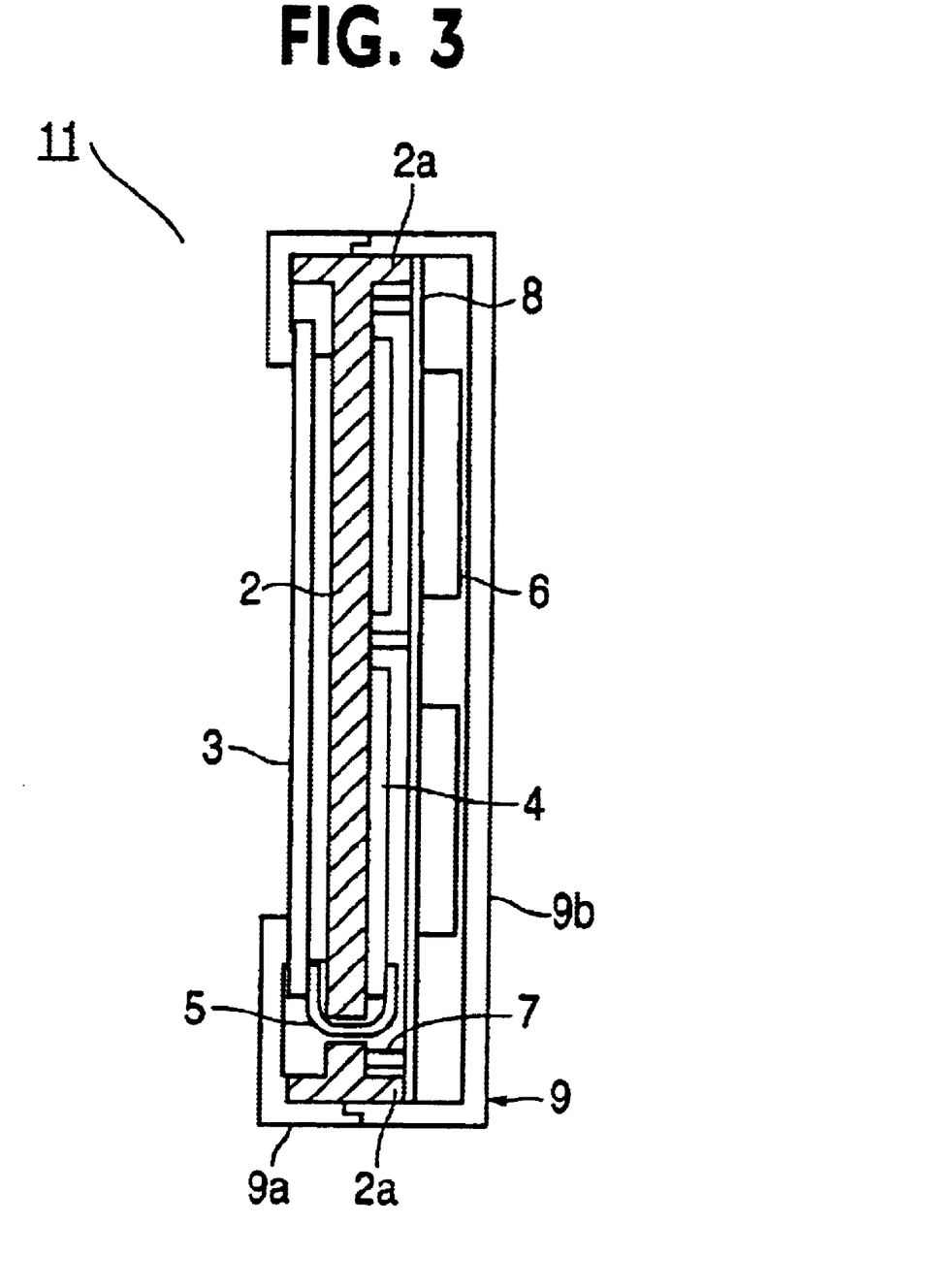
FIG. 3 is a sectional view showing a monitor according to the first embodiment of the present invention.

From FIG. 1A to FIG. 3 are drawings for explaining the first embodiment of the present invention, in which FIGS. 1A and 1B are a perspective view and a sectional, view, respectively, showing a plasma display unit, FIGS. 2A to 2D are sectional views showing an assembly process of a plasma display unit, and FIG. 3 is a sectional view showing a monitor to which a plasma display unit is applied.

Referring to FIGS. 1A and 1B, plasma display unit 1 in this embodiment employs a chassis 2 having recesses 2b and 2b' provided on respective opposite surfaces 2-1 and 2-2 thereof, a bank 2a extending about the common peripheries thereof and, therewith, forming these recesses 2b and 2b', and a through-hole 2c. A display panel 3 composed of a front substrate 3a and a rear substrate 3b is accommodated in recess 2b. Display panel 3 has a screen size of type 42 (42 inches), for instance.

In the above structure, the bottom surface 2-1 contiguous recess 2b forms a base to which rear substrate 3b of display panel 3 is adhered, and bank 2a forms a side wall covering the periphery of display panel 3.

On the other hand, circuit board 4 is mounted on the surface 2-2 of chassis 2, and, circuit board 4 and display panel 3 are electrically connected to each other by a flexible cable 5.

As dearly seen in FIGS. 1(a) and 1(b), the ends of each flexible cable 5 extend through and beyond the opposite surface 2-2 of chassis 2, respectively, via through-hole 2c formed in chassis 2, so as to interconnect display panel 3 and circuit board 4.

As shown in FIG. 1B, bank 2a of chassis 2 extends with beyond the surface 2-2 mounted with circuit board 4, as well as beyond the surface 2-1 on which display panel 3 is mounted. Therefore, the entire structure of chassis 2 has an H-shaped cross section.

Bank 2a of chassis 2 protects the periphery of display panel 3, which is low in the mechanical strength, and hence, display panel 3 is prevented from damages, even without using a protector as in the prior art, in the assembly process in which a display panel is adhered to a chassis and a circuit board is secured to the chassis, in the processes of testing and inspections, and in the transportation among these processes.

Chassis 2 is formed of a light weight material such as aluminum or resin. An electro-magnetic shielding film may be applied to the shaped-body of these materials, as the measure for electromagnetic interference.

Although a chassis having an H-shaped cross section is shown in FIG. 1B, according to the principle of the present invention, it is necessary that chassis 2 has at least bank 2a', as indicated in FIG. 1B, which extends from the surface 2-1 to which display panel 3 is adhered.

Next, the process of combining display panel 3 and circuit board 4 into a unit by mounting them on a chassis 2 is explained in details with reference to FIGS. 2A to 2D.

Display panel 3 is composed of a front substrate 3a and a rear substrate 3b, both having a number of electrodes formed thereon for constituting discharge cells and bonded each other with a gap therebetween for forming a predetermined discharge space. Firstly, as shown in FIG. 2A, an end of each flexible cable 5 is connected to a corresponding group of electrode terminals exposed on the respective edges of front substrate 3a and rear substrate 3b, by means of thermo-compression bonding. A conventional technology may be employed for the thermo-compression bonding, wherein an anisotropic conductive material is applied therebetween and heated under the application of a pressure.

Then, rear substrate 3b of display panel 3 to which flexible cable 5 has been connected is adhered to and secured to surface 2-1 contiguous the recess 2b of chassis 2 by means of a double-faced adhesive tape, for instance. It is desirable that another end of each flexible cable 5 is extended to the opposite surface 2-2 contiguous recess 2a of chassis 2 in advance, via through-hole 2c formed at the periphery of the recess 2a in chassis 2.

In the structure, display panel 3 is in a protected state such that the periphery thereof is covered by the bank 2a of chassis 2. Therefore, display panel 3 is prevented from damages due to the contact with an obstacle in the subsequent processes.

Then, circuit board 4 is mounted on the opposite surface 2-2 contiguous recess 2b' of chassis 2, and secured by means of a screw, for instance, as shown in FIG. 2C. For this purpose, one or more not-shown bores and tapped holes are respectively provided in circuit board 4 and chassis 2, in advance.

Finally, another end of each flexible cable 5 having one end bonded to display panel 3 is connected to circuit board 4, as shown in FIG. 2D. This connection is conducted by using connectors. Thus, a plasma display unit 1 is completed. In FIG. 2D, screws 4 are omitted.

Practically, the processes of mounting circuit board 4 on chassis 2 and connecting; flexible cable 5 to circuit board 4 are performed in a condition where chassis 2 having display panel 3 adhered thereto as shown in FIG. 2B is held such that the surface thereof, to which the circuit board is mounted, is positioned upwardly.

Accordingly, the process for reversing chassis 2 is included, however, display panel 3 is in the structure protected by chassis 2, as in this embodiment, and is prevented from a damage to be accompanied by the handling in such reversing.

Also, it is possible, in the processes of tests and inspections, to insure the reinforcement of display panel 3 and to protect the display panel and flexible cables from external forces, without using a protector as in the prior art. Further, improvement in the display quality can be expected, because chassis 2 has an excellent heat dissipation efficiency by virtue of its larger surface area compared with that of display panel 3.

In the following, a monitor which is applied with a plasma display unit such as mentioned above will be explained with, reference to FIG. 3.

FIG. 3 is a sectional view showing the monitor in a preferred embodiment.

The above-mentioned plasma display unit 1 is equipped with minimum requisite constituents for displaying, and, for performing display operations in response to external signals, it is necessary to introduce interface circuits etc., and further, a frame for accommodating the display unit and the circuits is needed for constituting a monitor.

In this embodiment, monitor 11 comprises a mounting board 8 supported by fixing blocks 7 which are provided on chassis 2 of a plasma display unit 1, at the side on which circuit boards 4 are mounted. Mounting board 8 is supported by the bank 2a of chassis 2 as well as fixing blocks 7. Typically, each fixing block 7 is a columnar shape member and is secured to chassis 2 by screws, for instance. Mounting board 8 is secured to the bank 2a of chassis 2 and also to fixing blocks 7, by screws, for instance.

One or more interface circuits 6 for receiving external signals are mounted on mounting board 8, and a frame 9 is provided so as to protect the back side of plasma display unit 1 and interface circuits 6.

Frame 9 has a structure capable of being divided into a front part 9a and a rear part 9b, and, the front and rear parts are joined to each other at the bank 2a of chassis 2 and secured thereto. The back side or rear part 9b of frame 9 is box-shaped, covering the rear side of plasma display unit 1, entirely, and the front side or part 9a of frame 9 is window-shaped, exposing therethrough the entire display area of display panel 3, and covering the periphery of display panel 3.

Interface circuits 6 are connected to circuit board 4, which constitutes a driving circuit, by not-shown cables, and sends signals to circuit board 4 from the outside, and hence, desired images and so forth can be displayed.

For displaying television images, it is necessary to connect to a tuner circuit for receiving televisional signal.

The back side portion in the monitor, covered with frame 9, likely becomes a high temperature, since display panel 3, circuit board 4 and interface circuits 6, all being heat generators, are collectively accommodated therein. Therefore, although not shown, frame 9 is provided with openings formed in the side thereof, for ventilation, together with a fan, so as to discharge the heat outside.

Figure 4:
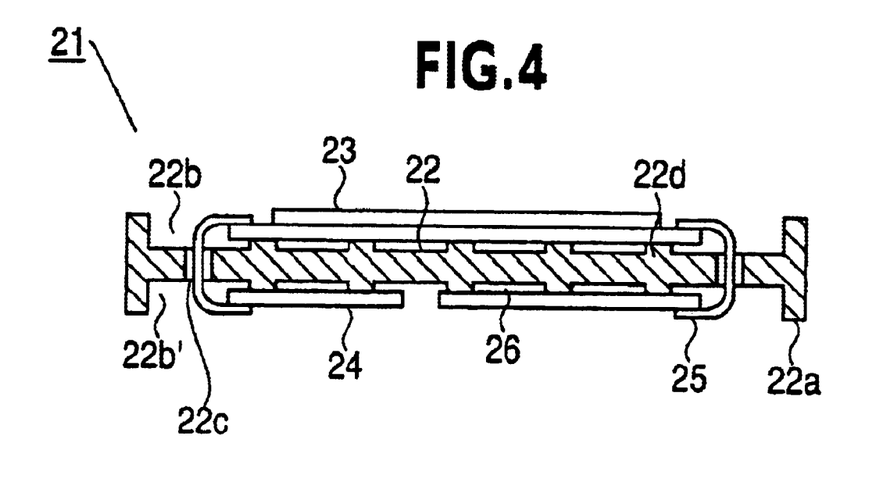
FIG. 4 is a sectional view showing a plasma display unit according to the second embodiment of the present invention.

FIG. 4 is a sectional view showing a plasma display unit according to the second embodiment of the present invention.

Similarly to the first embodiment, the plasma display unit 21 in this embodiment comprises a chassis 22 having a bank 22a, in which a display panel 23 is adhered to one of a pair of opposite surfaces of chassis 22, and circuit boards 24 are mounted on another of the pair of opposite surfaces of chassis 22.

The difference from the first embodiment is seen in the structure of chassis 22. That is, bank 22a, recesses 22b and 22b', and through-hole 22c are similarly provided, however, a plurality of protrusions 22d are differently provided for the respective recesses 22b and 22b' in the pair of opposite surfaces of chassis 2, for improving the heat dissipation characteristics. The plurality of protrusions 22d increases the surface area of chassis 2 and also create spaces 26 between display panel 23 and chassis 22, and, between circuit boards 24 and chassis 22, thus enabling efficient discharge of the heat generated in display panel 23 and circuit board 24.

Although not clear from FIG. 4, protrusions 22d are formed to have a stripe pattern or a grid pattern.

In this second embodiment, the assembly process of a plasma display unit and the application of the plasma display unit to a monitor are not mentioned, because of the similarity to those in the first embodiment, as explained with reference to FIGS. 2A to 2D and FIG. 3.

FIGS. 5A to 5E are sectional views for explaining the third embodiment of the present invention.

FIGS. 5A to 5E show an assembly process, since the third embodiment features the method of assembly. In this embodiment, chassis comprises an integrated body of two sub-chassis, each having a U-shaped sectional view, and adhered to each other through the respective rear surfaces thereof.

Figure 5A:
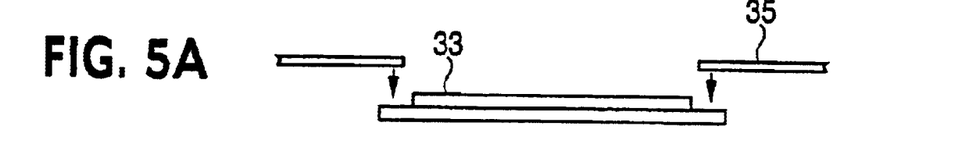
FIGS. 5A to 5E are sectional views for explaining the third embodiment of the present invention.

At the beginning, each of flexible cables 35 is connected to display panel 33 as shown in FIG. 5A, by using a thermo-compression bonding. That is, similarly to the first embodiment, flexible cables 35 are electrically connected to the corresponding groups of electrodes exposed on the respective edges of the front and rear substrates constituting display panel 33.

Figure 5B:
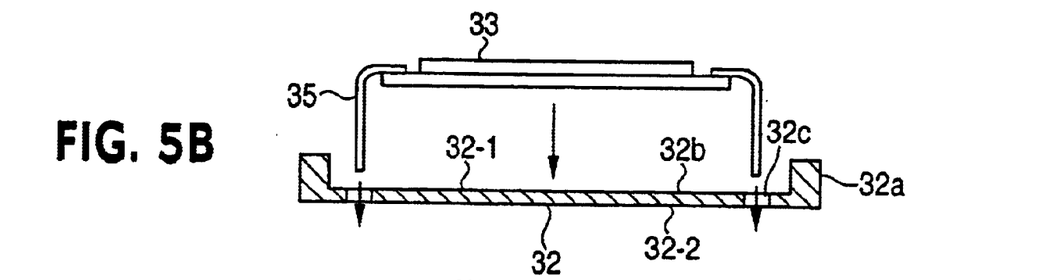

Then, the rear substrate of display panel 33 to which flexible cables 35 have been bonded is adhered to a surface 32-1 contiguous to the recess 32b of the first sub-chassis 32 by using a double-faced adhesive tape, for instance, as shown in FIG. 5B. It is desirable that another end of each flexible cable 35 is made to extend to and beyond the opposite surface 32-2 of sub-chassis 32, in advance, via through-hole 32c formed at the periphery of the recess of sub-chassis 32. The first subchassis 32 has a bank 32a formed on the periphery thereof.

Figure 5C:
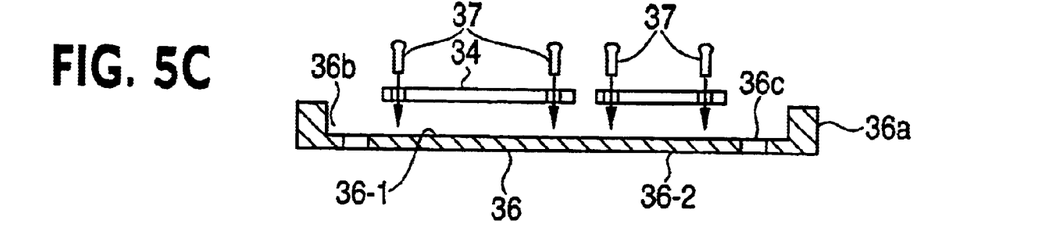

On the other hand, circuit boards 34 are secured to a surface 30-1 contiguous the recess 36b of the second sub-chassis 36, as shown in FIG. 5C, by means of screws 37, for instance. The second sub-chassis 36 is composed of a member separated from the first sub-chassis 32, and has a bank 36a, recess 36b and through-holes 36c, the same as in the first sub-chassis 32.

The process of securing circuit board 34 to the second sub-chassis 36 may be conducted concurrently with the process of thermo-compressive bonding of flexible cables 35 to display panel 33 as explained with reference to FIG. 5A and with the process of adhering display panel 33 to the first sub-chassis 32 as explained with reference to FIG. 5B.

Figure 5D:
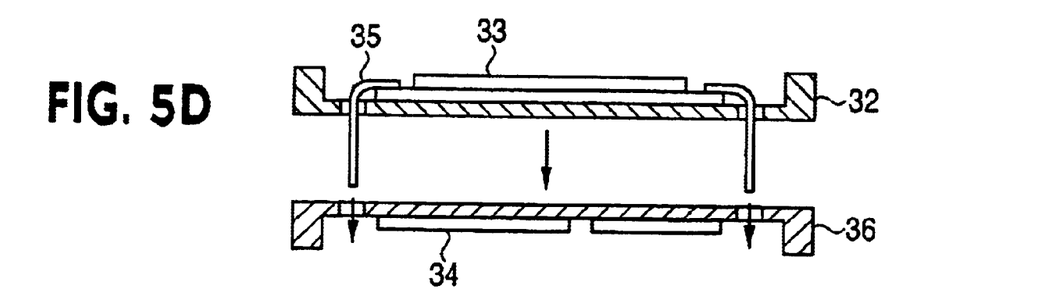

The first sub-chassis 32 having display panel 33 adhered thereto and the second sub-chassis 36 having circuit boards 34 secured thereto are combined into a single body through the respective rear surfaces 33-2 and 36-2 thereof being bonded to each other, as shown in FIG. 5D. In the above process, another end of each flexible cable 35 connected to display panel 33 at one end thereof is made extend to the circuit board 34, via corresponding one of through-holes 36c formed in the second sub-chassis 36.

The bonding together of the first chassis 32 and the second chassis 36 is performed by using a double-faced adhesive tape or other means including screws, solder and fasteners such as a buckle or "Velcro" (registered trademark) type patterns.

Figure 5E:
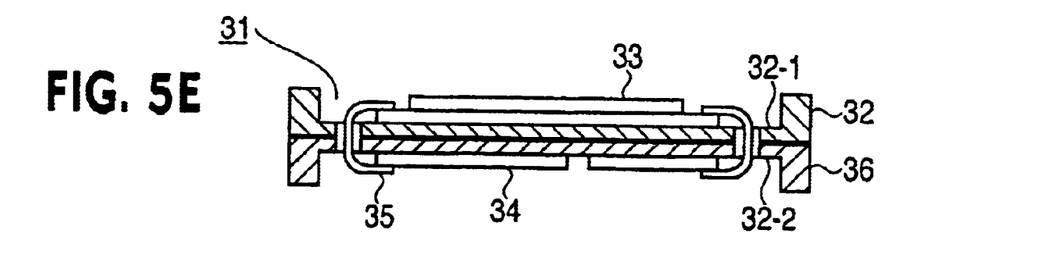

Finally, respective opposite ends of flexible cables 35 are connected to circuit board 34, as shown in FIG. 5E, and thus, plasma display unit 31 is completed. The connection of flexible cables 35 is conducted by using connectors for the cables.

According to the third embodiment, the first chassis 32 and the second chassis 36 are prepared separately, and display panel 33 and circuit board 34 are individually mounted on these chassis, therefore, the efficiency can be improved thanks to the concurrent processes, and display panel 33 can be freed from the burden, i.e., risk of damage, in the mounting process of circuit board 34.

FIGS. 6A to 6D are sectional views showing an assembly process according to the fourth embodiment of the present invention. This embodiment is a modification of the assembly process in the first embodiment, and same or like reference numerals in the drawings designate same or corresponding parts in the first embodiment.

Figure 6A:
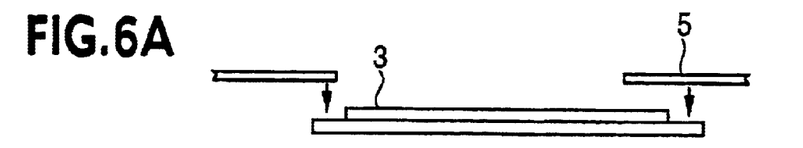
FIGS. 6A to 6D are sectional views showing an assembly process of a plasma display unit according to the fourth embodiment of the present invention.

Firstly, one end of each flexible cable 5 is connected to an electrode terminal group on display panel 3, as shown in FIG. 6A, by using a thermo-compression bonding. This connection process is similar to that in the first embodiment explained with reference to FIGS. 2A to 2D.

Figure 6B:
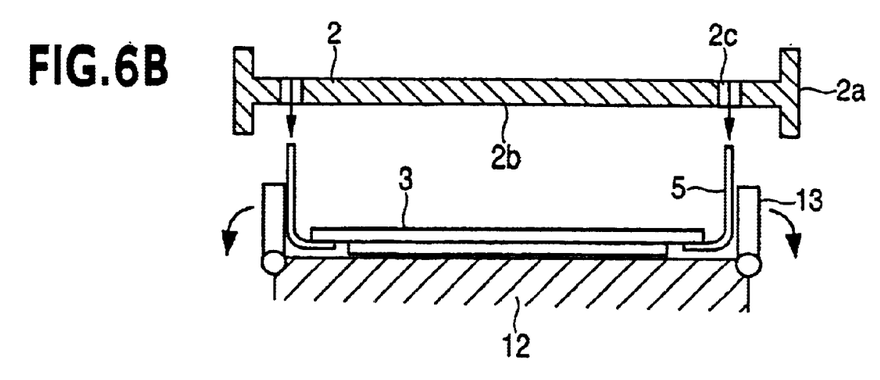

Next, the rear substrate of display panel 3 having flexible cables 5 connected thereto is placed on a supporting stage 12, and flexible cables 5 are guided to direct upward, as shown in FIG. 6B, by rotary guides 13, and then, chassis 2 is lowered to be almost adhered to the rear substrate of display panel 3.

In the above process, the mutual position of chassis 2 and display panel 3 are adjusted so that each of the guided flexible cables 5 mates corresponding one of through-holes 2c in, chassis 2, and when the respective ends of flexible cables 5 are inserted into corresponding through-holes 2c, each rotary guide 13 is revolved in the direction indicated by the corresponding arrow.

Then, chassis 2 is further lowered, another end of each flexible cable 5 extends to the opposite surface of chassis 2, and finally, chassis 2 comes in contact with display panel 3 to be adhered thereto, which is in a condition accommodated in the recess 2b and protected by the bank 2a of chassis 2. Adhesive means such as a double-faced adhesive tape is applied to the recess 2b of chassis 2, in advance, and display panel 3 is secured to chassis 2 by the adhesive means.

Figure 6C:
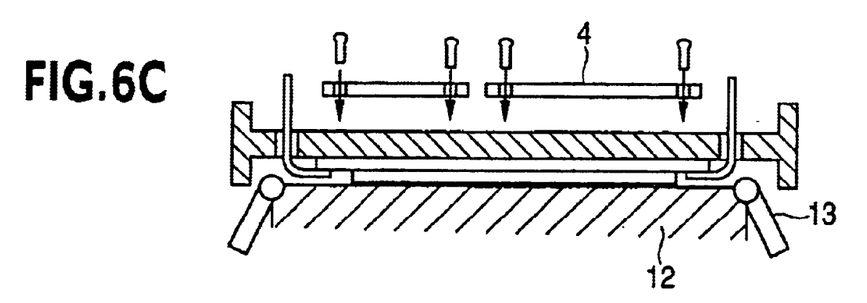

Then, circuit boards 4 are secured to the rear surface of chassis 2, opposite to recess 2b having display panel 3 adhered thereto, as shown in FIG. 6C, by using screws 4a. For the securing by the screws, the chassis and circuit board are provided with bores and tapped holes, respectively, as in the first embodiment.

Figure 6D:
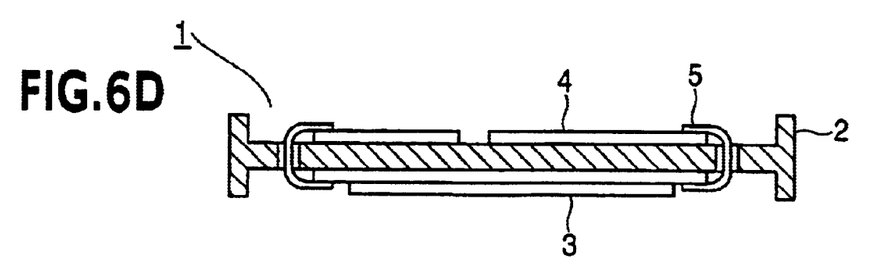

Finally, another end of each flexible cable 5 is connected to circuit board 4, as shown in FIG. 6D, and plasma display unit 1 is completed. Although not shown, this connection is conducted by using connectors for the cables, for instance. In FIG. 6D, screws 4a are not shown.

According to the fourth embodiment, the process of adhering display panel 3 to chassis 2 and the process of securing circuit board 4 to chassis 2 can be conducted in series under the condition where display panel 3 is disposed on the supporting stage 12.

In the processes of tests and inspections after plasma display unit 1 is completed, the mechanical strength of display panel 3 is assured and display panel and flexible cables can be protected from the external force without using a protector, as in the first embodiment.

Figure 7A:
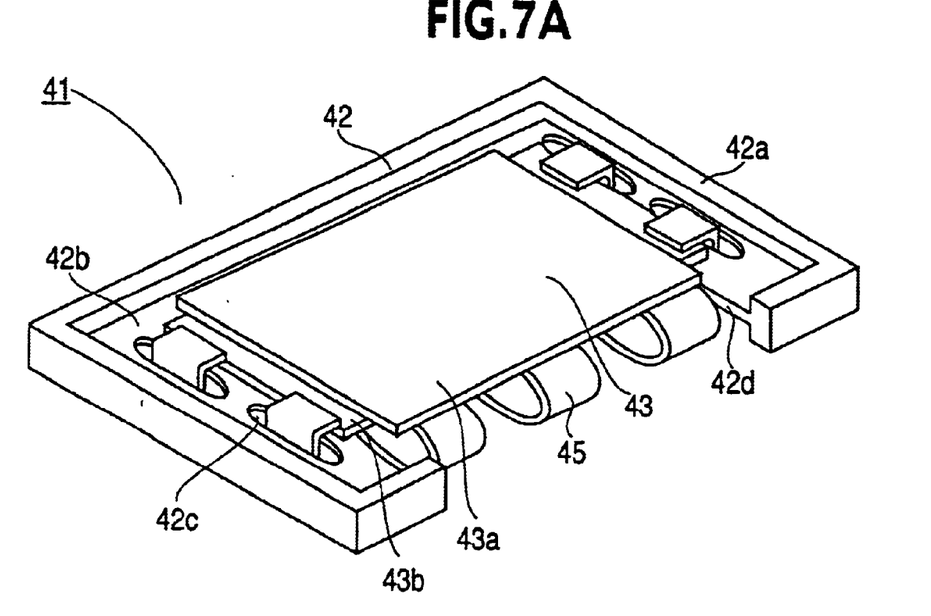
FIGS. 7A and 7B are a perspective view and a sectional view, respectively, both showing a plasma display unit according to the fifth embodiment of the present invention.
Figure 7B:
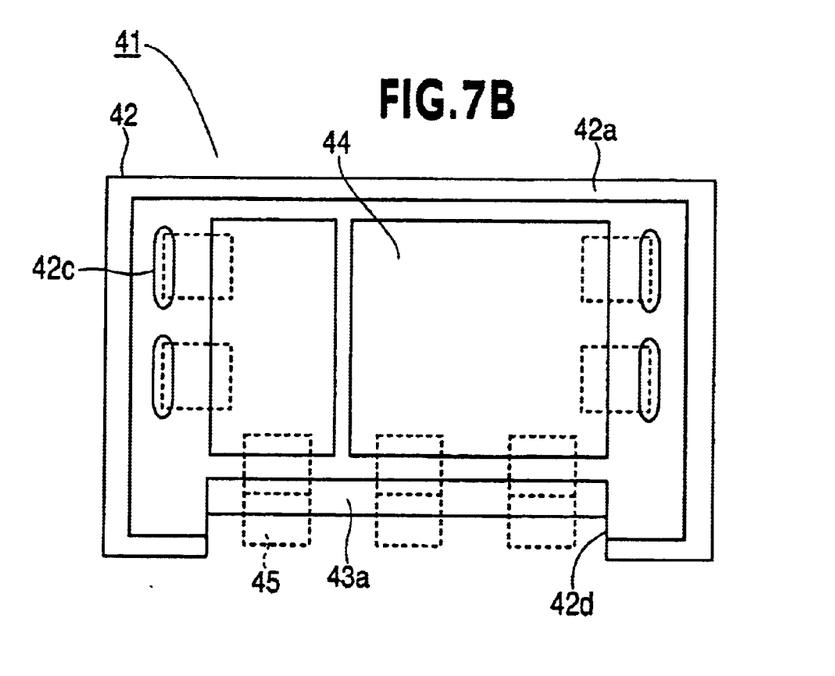

FIGS. 7A and 7B and FIGS. 8A to 8D are for explaining the fifth embodiment of the present invention, where FIGS. 7A and 7B are a perspective view and a sectional view, respectively, both showing a plasma display unit according to the fifth embodiment of the present invention, and FIGS. 8A to 8D are sectional views showing an assembly process of the plasma display unit according to the fifth embodiment of the present invention.

As shown in FIGS. 7A and 7B, plasma display unit 41 of this embodiment comprises a chassis 42 which has a cut-out 42d in addition to a bank 42a, recess 42b and through-holes 42c, wherein a display panel 43 composed of a front substrate 43a and a rear substrate 43b is accommodated in recess 42b.

This embodiment features in that chassis 42 has a cut-out 42d, and display panel 43 is disposed so that an edge of its front substrate 43a appears in the cut-out 42d, and hence, the connection of a flexible cable to the display panel can be carried out through the cut-out. FIG. 7B is a plan view of the chassis, taken from the rear side thereof, showing that the front substrate 43a of display panel 43 which is disposed at the front surface side of chassis is exposed from the cut-out 42d.

Display panel 43, circuit boards 44 and flexible cables 45 are the same as in the first embodiment. In FIG. 7B, each flexible cable 45 is shown in dotted lines.

Cut-out 42d is provided for enabling flexible cables 45 to be thermo-compressively bonded to the front substrate 43a of display panel 43 after the display panel is secured to chassis 42. The assembly process including this thermo-compression bonding will be explained in the following.

Figure 8A:
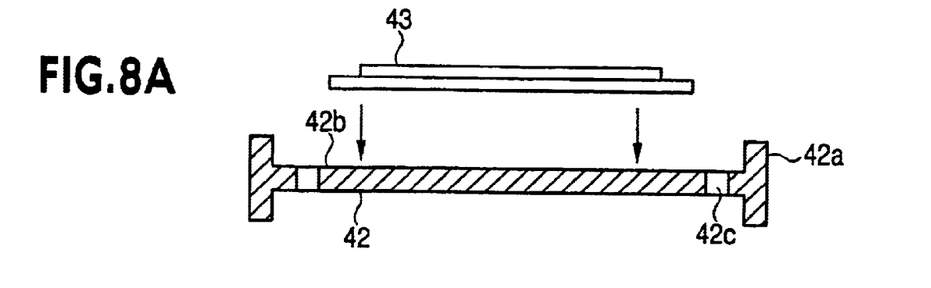
FIGS. 8A to 8D are sectional views showing an assembly process of the plasma display unit according to the fifth embodiment of the present invention.

First, the rear substrate 43a of a display panel 43 is adhered to the recess 42b of chassis 42, as shown in FIG. 8A. An adhesive means such as a double-faced adhesive tape is provided for the predetermined portion of the surface of chassis 42, in advance, and thus, display panel 43 is adhered by the adhesive means.

Figure 8B:
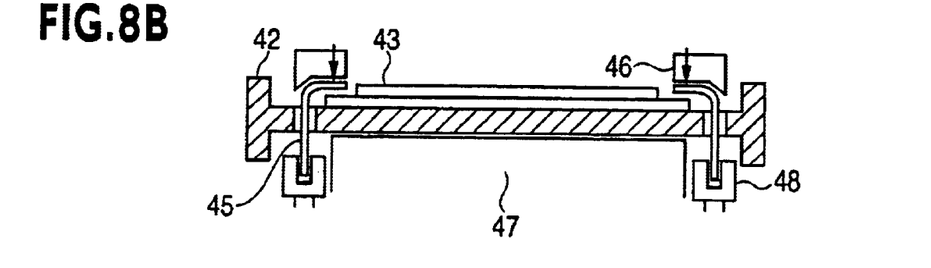

Next, as shown in FIG. 8B, flexible cables 45 are arranged so as to pass through respective corresponding through-holes 42c of chassis 42 disposed on a supporting stage 47 and held by respective corresponding cable guides 48, and then, respective one ends of flexible cables 45 are thermo-compressively bonded to display panel 43 by using compressing heads 46.

Each of compressing heads 46 has a tapered portion, and hence, each flexible cable 45 is bent along the tapered portion and contacts with display panel 43, when compressing head 46 is lowered. Concurrently, each of cable guides 48 is lowered accompanied with compressing heads 46.

The above mentioned process of thermo-compression bonding is applicable only to the rear substrate 43b of display panel 43 (see FIGS. 7A and 7B), and a different method has to be applied to front substrate 43a in which electrodes are exposed on a surface directing downward. For this, the cut-out 42d is used and a compression bonding is performed from the rear side of the chassis.

Although not shown in the drawings, the process of the compression bonding to front substrate 43a is carried out such that chassis 42 is reversed and then, similarly to the process shown in FIG. 8B, flexible cables 45 each held by corresponding one of cable guides 48 are thermo-compressively bonded by applying thereto compressing heads 46, each having a tapered portion, through the cut-out 42d (see FIGS. 7A and 7B).

Figure 8C:
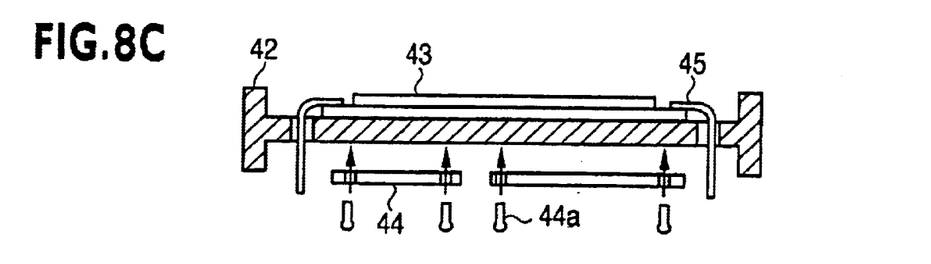

After the compression bonding of flexible cables 45 to all of electrode terminal groups is completed, circuit boards 44 are secured to the rear surface of chassis 42, which is opposite to the surface having display panel 43 adhered thereto, by using screws 44a, for instance, as shown in FIG. 8C. Circuit boards 44 and chassis 42 are provided with not-shown bores and tapped holes for the screws 44a, respectively, in advance.

Figure 8D:
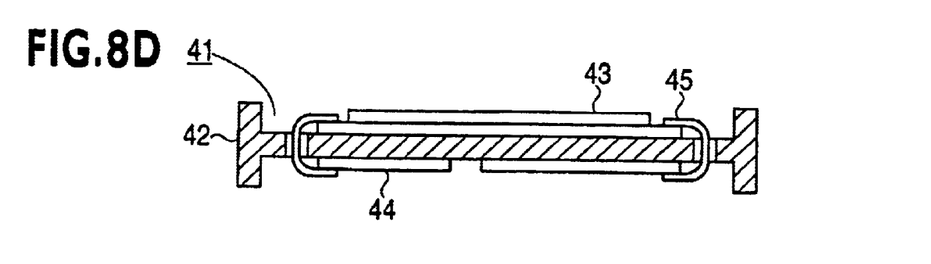

Finally, another end of each flexible cable 45 connected to display panel 43 is connected to a circuit board 44, as shown in FIG. 8D, and plasma display unit 41 is completed. Although not shown, cable connectors are employed for this connection, for instance.

According to the fifth embodiment, the handling of display panel 43 is easy in the process of adhering display panel 43 to chassis 42, since none of flexible cables 45 is connected to display panel 43 then, which eliminates need of troublesome operations of performing the adhesion of the display panel during inserting flexible cables into corresponding through-holes 42c.

In the completed plasma display unit 41, the configuration of display panel 43 accommodated in the recess 42b and hence protected by bank 42a is the same as in the embodiments from the first to the fourth, even the cut-out 42d exists, and hence, display panel 43 can be free from the damages during tests and inspections, without using a protector.

The embodiments from the first to the fifth explained as above have a structure in which a display panel is protected by a bank perpendicularly extending from the surface of the display panel is adhered thereto, however, another structure may be employed such as that having an additional member extending further from the bank in parallel to the surface of the display panel, for instance. That is, it is enough for the present invention to be equipped with at least a bank covering the periphery of a display panel, and therefore, it may be free to add a constitution for enhancing the protection.

Furthermore, it is disclosed that each of flexible cables for connecting a display panel to circuit boards extends via through-hole formed in a chassis, however, it is permitted to employ a different path, a groove formed in the surface of the bank, for instance, wherein the flexible cable is disposed in the groove and extends along the outer side of the bank.

Still further, the present invention may be applied to other types of flat display units including liquid crystal display units, EL display units and FED display units.

A many apparently wide different embodiments of this invention may be made without departing from the spirit and scope of thereof, it is to be understood that the invention is not limited to the specific embodiments thereof except as defined in the appended claims.

What is claimed is:

1. A flat display unit comprising:
    a display panel;
    a circuit board having circuits thereon for driving the display panel; and
    a chassis combining the display panel and the circuit board into a unit, said chassis having first and second surfaces opposite to each other on which the display panel and the circuit board are mounted, respectively, and a side wall extending from an edge of the first surface on which the display panel is mounted, perpendicularly to the first surface, and along the periphery of the display panel.

2. A flat display unit as set forth in claim 1, wherein said chassis further comprises another side wall extending from the edge of the second surface on which the circuit board is mounted, perpendicularly to the second surface, and covering the periphery of the circuit board.

3. A flat display unit as set forth in claim 1, wherein said chassis includes fins provided on the second surface the circuit board is mounted thereon, in the form of a plurality of protrusions.

4. A flat display unit as set forth in claim 1, wherein said chassis has a through-hole formed adjacent to the periphery thereof, the through-hole allowing a cable to pass therethrough for electrically interconnecting the display panel and the circuit board.

5. A flat display unit as set forth in claim 1, wherein said chassis comprises first and second sub-chassis on which the display panel and the circuit board are mounted, respectively, wherein the first and second sub-chassis are joined together through respective rear surfaces thereof.

6. A flat display unit as set forth in claim 1, wherein said chassis has a cut-out formed at a side thereof, the cut-out allowing a cable to pass therethrough for electrically interconnecting the display panel and the circuit board.

7. A flat display unit as set forth in claim 2, wherein said chassis includes fins provided on the second surface of the circuit board is mounted thereon, in the form of a plurality of protrusions.

8. A flat display unit as set forth in claim 2, wherein said chassis has a through-hole formed adjacent to the periphery thereof, the through-hole allowing a cable to pass therethrough for electrically interconnecting the display panel and the circuit board.

9. A flat display unit as set forth in claim 2, wherein said chassis comprises first and second sub-chassis on which the display panel and the circuit board are mounted, respectively, wherein the first and second sub-chassis are joined together through respective rear surfaces thereof.

10. A flat display unit as set forth in claim 2, wherein said chassis has a cut-out formed at a side thereof, the cut-out allowing a cable to pass therethrough for electrically interconnecting the display pane and the circuit board.

11. A flat display unit as set forth in claim 1, wherein the side wall extends along and covers the periphery of the display panel.

12. A flat display unit as set forth in claim 1, wherein the side wall extends along and covers the entire periphery of the display panel.

13. A flat display unit including a chassis mounted with a display panel and a circuit board for driving the display panel, on both surfaces thereof, respectively, for combining the display panel and the circuit board into a unit, wherein the chassis comprises a pair of recesses provided in both of the surfaces, respectively, and the display panel is adhered to one of the recesses by an adhesive and the circuit board is secured to another of the recesses by a securing element or material, and wherein the display panel and the circuit board are electrically interconnected with each other by a wiring cable which is lead to both of the surfaces of the chassis through a through-hole provided in the chassis.

14. A method for fabricating a flat display unit in which a display panel and a circuit board for driving the display panel are combined into a unit through a chassis, the method comprising:

connecting each of terminals at an end of a flexible cable to corresponding one of a plurality of electrode terminals exposed on an edge of the display panel;

preparing a chassis having front and rear surfaces opposite to each other, a side wall extending from the periphery of the chassis, perpendicularly to the front surface, and a recess defined on the front surface by the side wall;

accommodating the display panel in the recess and adhering thereto the display panel;

extending another end of the flexible cable to the rear surface of the chassis through a through-hole provided in the chassis;

mounting the circuit board on the rear surface of the chassis;

connecting said another end of the flexible cable to the circuit board, so that the circuit board and the display panel are in a mutually conductive condition.

15. A method for fabricating a flat display apparatus as set forth in claim 14, wherein the chassis further comprises a cut-out provided on an edge thereof, and the circuit board and display panel are connected each other by the flexible cable passing through the cutout.

16. A method for fabricating a flat display apparatus in which a display panel and a circuit board for driving the display panel are combined into a unit through a chassis, the method comprising:

connecting each of terminals at an end of a flexible cable to corresponding one of plurality of electrode terminals exposed on an edge of the display panel;

preparing a first chassis having front and rear surfaces opposite to each other, a side wall which extends from the periphery of the first chassis, perpendicularly to the front surface, and a recess defined on the front surface by the side wall surrounding thereof;

accommodating the display panel in the recess and adhering thereto the display panel;

extending another end of the flexible cable to the rear surface of the first chassis through a through-hole provided in the first chassis;

mounting the circuit board on a front surface of a second chassis having a rear surface opposite to the front surface thereof;

passing said another end of the flexible cable through a through-hole provided in the second chassis so as to extend to the front surface of the second chassis;

adhering respective said rear surfaces of the first and second chassis;

connecting said another end of the flexible cable to the circuit board, so that the circuit board and the display panel are in a mutually conductive condition.

17. A method for fabricating a flat display apparatus as set forth in claim 16, wherein each of the first and second chassis further comprises a cut-out provided on a respective corresponding one of edges thereof, and the circuit board and display panel are connected each other by the flexible cable passing through the cut-out.

18. A chassis, comprising:

a support structure having first and second opposite main surfaces affording mounting thereon, and support of, a display panel and a circuit board to drive the display panel, together forming a display unit; and the support structure further comprising a sidewall extending perpendicularly from the first surface, on which the display panel is to be mounted, adjacent a periphery of the support structure and spaced from but extending along a periphery of the display panel to be mounted on the first surface.

19. A chassis as set forth in claim 18, wherein the chassis further comprises a through-hole connecting the first and second opposite surfaces on which the display panel and the circuit board are respectively to be mounted and affording a passageway for passage therethrough of a flexible cable to electrically connect the display panel and the circuit board.

20. A chassis as recited in claim 18, wherein:

the sidewall defines a first recess in which the display panel is received, when mounted on the first surface of the support structure.

21. A chassis as recited claim 18, wherein the sidewall extends perpendicularly to the second main surface of the support so as to define, with the second main surface, a second recess in which the circuit board is received, when mounted on the second surface of the support structure.

22. A chassis as recited in claim 18, wherein the display panel is of a thickness of a first dimension and the sidewall extends from the first main surface by a distance greater than the first dimension.

23. A chassis as recited in claim 18, wherein the circuit board is of a thickness of a second dimension and the sidewall extends from the second surface by a distance which is greater than the second dimension.

* * * * *

UNITED STATES PATENT AND TRADEMARK OFFICE
CERTIFICATE OF CORRECTION

PATENT NO. : 6,847,415 B1
DATED : January 25, 2005
INVENTOR(S) : Hiroshi Yoshimura et al.

It is certified that error appears in the above-identified patent and that said Letters Patent is hereby corrected as shown below:

<u>Column 11,</u>
Line 61, change "lead" to -- led --.

<u>Column 13,</u>
Line 11, insert -- in -- after "recited".

Signed and Sealed this

First Day of November, 2005

JON W. DUDAS
*Director of the United States Patent and Trademark Office*